United States Patent [19]

Ma

[11] Patent Number: 5,653,202
[45] Date of Patent: Aug. 5, 1997

[54] INTAKE MANIFOLD SYSTEM

[75] Inventor: Thomas T. Ma, South Woodham Ferrers, United Kingdom

[73] Assignee: Ford Motor Company, Dearborn, Mich.

[21] Appl. No.: 696,981

[22] PCT Filed: Jan. 12, 1995

[86] PCT No.: PCT/GB95/00055

§ 371 Date: Jul. 15, 1996

§ 102(e) Date: Jul. 15, 1996

[87] PCT Pub. No.: WO95/22687

PCT Pub. Date: Aug. 24, 1995

[30] Foreign Application Priority Data

Feb. 22, 1994 [GB] United Kingdom ............... 9403290
Mar. 4, 1994 [GB] United Kingdom ............... 9404156
May 11, 1994 [GB] United Kingdom ............... 9409400

[51] Int. Cl.$^6$ ............................................. F02M 35/10
[52] U.S. Cl. ........................ 123/184.43; 123/184.49; 123/184.59
[58] Field of Search ................... 123/184.42, 184.43, 123/184.44, 184.49, 184.48, 184.47, 184.53, 184.59, 184.21

[56] References Cited

U.S. PATENT DOCUMENTS

| | | | |
|---|---|---|---|
| 4,543,918 | 10/1985 | Ma | 123/184.53 |
| 4,791,903 | 12/1988 | Fujieda et al. | 123/472 |
| 5,085,177 | 2/1992 | Ma | 123/184.53 |
| 5,379,735 | 1/1995 | Ma | 123/184.42 |
| 5,421,296 | 6/1995 | Hitomi et al. | 123/184.53 |
| 5,427,078 | 6/1995 | Hitomi et al. | 123/184.53 |

FOREIGN PATENT DOCUMENTS

| | | |
|---|---|---|
| 0187654 | 7/1986 | European Pat. Off. . |
| 2409386 | 6/1979 | France . |
| 59-231133 | 12/1984 | Japan . |
| 63-65117 | 3/1988 | Japan . |
| 2016081 | 9/1979 | United Kingdom . |
| 2073320 | 10/1981 | United Kingdom . |
| 2218152 | 11/1989 | United Kingdom . |
| WO89/11026 | 11/1989 | WIPO . |
| WO92/045535 | 3/1992 | WIPO ............... 123/184.49 |

*Primary Examiner*—David A. Okonsky
*Attorney, Agent, or Firm*—Jerome R. Drouillard

[57] ABSTRACT

An intake manifold system 10 is described for a multi-cylinder four stroke spark-ignition internal combustion engine 12. Each cylinder has at least one intake port 20, each intake port 20 being connected at one end to the combustion chamber by at least one intake valve 14 and at the other end to a first intake duct 22 that is connected to a first plenum 24 common to the first intake ducts 22 of other engine cylinders. Each intake port 20 is also supplied by a second intake duct 32 the through flow cross-section of which is at least 15% of the maximum effective through flow cross-section of the open intake valve and controlled by a variable throttle 40, the second intake duct 32 terminating near and being directed towards the closed end of the intake port 20 such that during the periods that the intake valve 14 is closed the gas drawn in through the second intake duct 32 by manifold vacuum flows around the end of the intake port 20 and displaces gases present in the intake port 20 into the associated first intake duct 22.

20 Claims, 6 Drawing Sheets

INTAKE MANIFOLD SYSTEM

BACKGROUND OF THE INVENTION

The present invention relates to an intake manifold system for a multi-cylinder four stroke spark-ignition internal combustion engine.

The invention seeks to provide an intake system that improves control over the distribution of fuel and air within the charge in the engine combustion chamber.

According to the present invention, there is provided an intake manifold system for a multi-cylinder four stroke spark-ignition internal combustion engine wherein each cylinder has at least one intake port, each intake port being connected at one end to the combustion chamber by at least one intake valve and at the other end to a first intake duct that is connected to a first plenum common to the first intake ducts of other engine cylinders, wherein each intake port is further supplied with gases containing no fuel by a second intake duct having a fixed outlet cross-sectional area equal to between 25% and 45% of the maximum effective through flow cross-sectional area of the open intake valve, the second intake duct being directed towards the closed end of the intake port whereby, during the periods that the intake valve is closed, gas is drawn in through the second intake duct by manifold vacuum and stored in the first intake duct, and wherein the solid boundary walls of the intake port and of the discharge end of the second intake duct define a U-shaped flow path for guiding the gas entering the intake port from the second intake duct, the geometry of the solid boundaries being such that during operation gas enters from one side of the intake port, performs a single U-turn by flowing around the intake valve stem while adhering to the walls of the intake port and enters the first intake duct from the other side of the intake port, the gas being thereby constrained to scavenge the closed end of the intake port and to displace substantially all the gases previously present therein into the first intake duct.

The invention is not the first proposal to blow air into the intake port to improve charge preparation. It is known for example to provide an intake manifold system in which an air assisted fuel injector is positioned near the intake valve to introduce air and fuel into the intake port. Small amounts of air, bypassing the butterfly throttle, have also been introduced into the intake port to assist charge preparation by stirring the air near the intake valve when it is closed. In all such systems, the size of the air jet has to be small in order to give the maximum jet velocity for fine atomising of the fuel or deep penetration for good turbulent mixing. Furthermore, the size of such an air jet cannot be made larger because the flow from it must be limited to less than the engine air intake flow during idling; otherwise it would interfere with the idle speed control of the engine. This limits the size of each air jet to less than 1% of the open intake valve area delivering no more than 80% of the throttled idle air flow to the engine.

In the present invention, the effective flow cross-section of the second intake duct is much larger to give significantly larger flows to satisfy at least 60% of the maximum engine air flow requirement and is not limited by the engine idle operating condition. The flow velocity emitted from the duct is kept low to give an organised flow around the end of the intake port with substantially no turbulent mixing.

It is also known to provide an exhaust gas recirculation (EGR) system in a spark ignition engine. In such an engine, the EGR pipe is conventionally connected to the intake plenum where the exhaust gases can mix thoroughly with the intake air before entering the intake ports. This is because it is not an acceptable practice to introduce the exhaust gases directly into each intake port where there is wet fuel since any fuel entrained within the neat exhaust gases will not find oxygen for combustion and will result in excessive hydrocarbons emissions in the exhaust gases and unstable combustion.

The present invention proposes taking in a major proportion of the intake charge at much higher flow rates under a wide range of operating conditions through the second intake ducts and storing it in the first intake ducts before it is drawn into the cylinders. This has various advantages that stem from being able to control the mixture strength in different parts of the combustion chamber either to achieve homogeneous mixing or to achieve charge stratification.

A problem encountered with fuel injected engines is that the fuel is not well mixed in the charge under all conditions. If fuel is injected into the intake port when the valve is closed, it tends to forms pools and this wall wetting causes hysteresis problems that affect cold starts and the transient response of the engine.

In the present invention, even when the intake valve is closed, the intake port continues to be scavenged by air drawn in through the second intake duct under the action of the manifold vacuum created by the other engine cylinders connected to the same first plenum. This maintains the intake port dry of fuel and creates in the first intake duct a column containing a stratified mixture of fuel and air.

Depending on the geometry of the intake manifold, in particular the length of the first intake duct, this column can either be stored ready to be introduced back into the same cylinder when the intake valve next opens or the mixture may enter the first plenum to mix thoroughly with the mixture drawn from other cylinders. If the charged is stored as a stratified column in a long duct, then when the intake valve opens, the column is transferred into the cylinder and determines the charge stratification within the cylinder. On the other hand if the first ducts are short, not only is better charge preparation achieved in each cylinder but homogeneity between cylinders is improved.

The ability to store a stratified column allows the invention to accentuate the inhomogeneity in the cylinder and thereby permit the engine load to be regulated at least in part by modifying the amount of fuel introduced into the cylinder (rather than the amount of fuel and air mixture) while introducing an excess of air into the engine. This permits losses associated with pumping air in the intake manifold to be reduced.

In an extreme case, it is possible to concentrate all the fuel at one end of cylinder as a homogeneous easily ignitable mixture while filling the lower end of the cylinder with air or exhaust gases into which the flame cannot propagate. Such a divided charge may be used to achieve very lean overall fuel-air mixture or very high overall EGR dilution. If air forms the lower part of the divided charge and a very rich fuel-air mixture forms the upper part, then such division can create incomplete combustion in the upper part of the combustion chamber while still delivering an overall stoichiometric mixture to a catalytic converter or an afterburner. The completion of combustion of such an exhaust gas mixture in the exhaust system can assist in raising the catalytic converter to its light off temperature. If exhaust gases form the lower part of the divided charge and a stoichiometric fuel and air mixture forms the upper part, then the engine can be run with high overall dilution thereby reducing the volumetric efficiency without disturbing the stoichiometry of the exhaust gases.

It should be mentioned that there have been disclosed systems in the prior art in which two intake ducts lead to each intake port and these have generally had one of three aims in mind.

The first aim of the prior art proposals, as exemplified by EP-A-0 098 543, is to achieve manifold tuning by matching the length of the intake ducts to the engine speed, a longer and narrower duct being used at low engine speeds and a shorter and wider duct at high engine speeds. The effect of flow reversal in the first ducts when the intake valve of a cylinder is closed is not appreciated, nor is the design of the intake port optimised by using the reverse flow to scavenge the closed end of the intake port and achieve charge mixture stratification control.

The second aim, as exemplified by GB-A-1,195,060 and U.S. Pat. No. 4,867,109, is to achieve flow balancing. In these systems, in addition to the conventional intake ducts leading from the intake throttle or throttles, there are interconnecting ducts that balance the flow between the cylinders. The flow through these balancing ducts will reverse directions as occurs in the first intake ducts of the present invention but while the first intake ducts in the present invention occupy the major cross sectional area of the intake ports, the balancing ducts in the prior art have a much smaller cross section. Because of the size and location of these balancing ducts the gases flowing into them play little part in scouring the closed end of the intake port or in transporting any significant volume of gas out of the intake port.

The last aim of the prior art in providing two ducts to each intake port, as exemplified by GB-A-2,114,221, GB-A2,038, 415 and GB-A-1,239,264, is to achieve high intake air velocity to increase turbulence at low engine speeds by using a smaller supply duct at low engine speeds and a larger supply duct at high speed. These proposals differ from the present invention in that, in all three cases, the smaller duct is required to supply premixed fuel and air, it being optional to provide fuel in the larger duct. In the present invention, the scouring of the intake port must be carried out by gases containing no fuel as the purpose of the scouring is to achieve charge mixture stratification.

EP-A-0 076 632 falls partially into both of the above latter two categories. Here a variable air jet supplying air from the intake duct across to a balancing port is used to induce a continuous vortex within the intake port while the intake valve is closed. However detailed study has shown that this cannot achieve complete scavenging of the intake port as required in the present invention. Without a solid boundary extending substantially to the axis of the cylindrical space above the intake valve head to guide the U-flow to scour or scavenge the closed end of the intake port, it is found that the flow from the air jet follows one of two possible stable flow patterns depending on the width of the jet. The first flow pattern is created with a narrow high velocity jet entering from one side of the intake port and inducing within the volume of the intake port a strong vortex, this being the aim of this prior art invention, but most of the content in the intake port merely rotates and remains inside the port. The second flow pattern is created with a wider lower velocity jet which initially tends to follow a U-flow path around the closed end of the intake port, but because of the absence of a solid boundary separating the forward and reverse flows, shearing action soon causes the deep U-flow pattern to collapse as the gas mixes into itself and the final flow pattern becomes one in which the air turns around in a shallower U-flow path near the immediate vicinity of the discharge boundary of the air jet, leaving the volume further inside the intake port undisturbed or circulating in counter rotation with the shallower U-flow. Here again the content at the end of the intake port is not scavenged.

It is found that there is a narrow range of the width of the air jet which can sustain the required deep U-flow pattern at the end of the intake port for a short period of time, even without the solid boundary specified in the present invention. However this is unstable and the flow pattern reverts to one or the other stable flow patterns during the engine cycle and in an unpredictable manner from one cycle to the next. This geometry is therefore not practical for any serious application because it fails to provide reliable and complete scavenging of the intake port which is the necessary condition in order to satisfy the main aim of the present invention for achieving the desired charge mixture stratification.

The consequence of not completely scavenging the content of the intake port during every engine cycle is that clean combustion cannot be guaranteed with the charge mixture stratification of this invention. In the case where liquid fuel is introduced as a spray into the intake port by means of a fuel injector, some of the liquid will be deposited on the back of the intake valve. Whereas a strong scavenging flow scouring the end walls of the intake port will be very effective in evaporating the fuel and transporting the vapour out of the port, a stagnant or recirculating flow would leave a pocket of liquid fuel or saturated vapour remaining inside the port. In the case where a premixed fuel-air mixture is supplied from the first intake duct and exhaust gas is introduced through the second intake duct as the scavenging gas for clearing the port of any fuel-air mixture left behind from the previous intake stroke, a pocket of fuel-air mixture would once again be retained in the port if the scavenging flow is poorly directed. In both these case, the unscavenged pocket of fuel will be drawn into the combustion chamber first at the beginning of the next intake stroke. Because of the organised bulk motion intentionally created in the combustion chamber to retain the charge stratification of the column of mixture drawn in during the course of the intake stroke, this first pocket will reside in a region of the combustion chamber which is disconnected from the main mixture charge by a layer of air or exhaust gas. Such pocket will not be burned with the main charge and will be discharged as increased exhaust emissions and cause increased fuel consumption.

In summary, none of the prior art has appreciated the possibility of controlling the charge mixture stratification inside the engine combustion chamber by controlling the charge mixture stratification inside the intake port and manifold system which gives clean combustion by positively guiding the U-flow to scour the closed end of the intake port thus ensuring stable and complete scavenging of the port during every engine cycle. Previous systems have overlooked the important details of the geometry of the intake port and of the discharge boundary of the second intake duct which are crucial in determining the success of the present invention, but are not recognised because the aims of those systems are concerned with parameters other than charge mixture stratification.

SUMMARY OF THE INVENTION

As so far described, the relative effective cross-sectional areas of the first and second intake ducts are fixed by the geometry of the ducts and therefore the part of the charge that is drawn directly during the intake period through the second intake duct and the part that was previously stored in the first intake duct before being drawn into the combustion chamber are in a fixed ratio to one another.

In a further embodiment of the invention, a variable flow control valve is provided immediately upstream of each intake valve of the engine to vary the effective flow cross-sectional area of the first intake duct in order to increase the proportion of the charge drawn in through the second intake duct during the intake period:

It is desirable to design the geometry of the first and second intake ducts in such a manner that the gases containing the dispersed fuel that are drawn in from the first intake duct remain in the vicinity of the spark plug at the end of the compression stroke.

In a preferred embodiment of the present invention, it is desirable to have a high swirl intake port so that the column of stratified intake charge drawn into the combustion chamber wraps itself as a helix to take on the shape of a coil spring within the cylinder. When axially compressed by the piston during the compression stroke, this gaseous mass retains its axial stratification and the regions with high fuel concentration remain in the vicinity of the spark plug near the top of the cylinder.

As a further possibility, stratification may be achieved across the cylinder bore rather than, or in addition to, the stratification along the cylinder axis.

In an engine having an intake port designed to promote swirl, by directing the fuel-containing part of the charge towards the centre of the combustion chamber and the air or EGR gases towards the outer circumference of the combustion chamber, a radial stratification will be achieved concentrating the fuel in the vicinity of the spark plug, which is generally placed near to the centre of the cylinder head.

In an engine having two intake valves, supplied by separate or siamesed intake ports designed to generate tumbling motion, that is to say rotation in a plane parallel to the plane of symmetry passing between the two intake valves, one can achieve stratification across the width of the cylinder bore with the fuel concentration being maximum in the latter plane of symmetry and reducing symmetrically on both sides.

In the latter embodiment, it is preferred to provide two second intake ducts, one for each intake valve, each positioned to the side of the associated valve remote from the plane of symmetry between the two valves.

In an intake manifold system of the invention, fuel may either be introduced directly at the first plenum, or it may initially be introduced into the intake port and be subsequently evaporated and transported into the first intake duct and the first plenum during the period that the intake valve is closed. The advantage in either case is that this gives rise to a substantially dry intake port during the intake period. During the intake stroke, the supply of fuel-air mixture always comes from the first intake duct and the supply of diluting air or EGR gases containing no fuel always come from the second intake duct. By ensuring the flow streams from the two intake ducts are kept parallel with one another, stratification of the fuel and air within the combustion chamber can be controlled accurately and in a unique pattern depending on the intake flow motion induced by the intake port design giving radial stratification in the case of swirl or diametrical stratification in the case of tumble.

Thus, the preferred embodiment of the invention achieves charge mixture stratification by packing air or EGR gases containing no fuel around a previously prepared homogeneous mixture of known fuel-air ratio. This is fundamentally different from a conventional in-cylinder injection stratified charge engine where the bulk air is penetrated locally by a high concentration of fuel to achieve charge stratification.

The advantage of achieving charge stratification by packing air around, below or to the side of a pre-mixed easily ignitable mixture, is that the mixture surrounding the spark plug is readily ignitable while the EGR gases or air that is not ignitable just fills out the regions of the combustion chamber remote from the spark plug. This ensures robust ignition in comparison with an in-cylinder injection stratified charge engine in which the location of the ignitable mixture zone in relation with the spark plug is poorly defined. In such an engine, the probability of having either a too rich or too lean mixture occurring in the vicinity of the spark plug is relatively high and this results in unreliable ignition. It is consequently easier to calibrate an engine of this invention to run satisfactorily over a wide range of speeds and loads using stratified dilution as the main control means.

The preferred embodiment of the invention has particular application to assisting light-off of a catalytic converter during cold starts. By calibrating the mixture stored in the first intake duct at a very rich fuel-air ratio and diluting the intake charge with a lot of air from the second intake duct to create mixture stratification across the cylinder, it is possible to achieve incomplete combustion within the mixture in one part of the combustion chamber while leaving sufficient unused air in another part of the combustion chamber. The exhaust gases from the engine containing unburned fuel and air, once thoroughly mixed in the exhaust system, can be re-ignited and burnt completely in an afterburner in front of a catalytic converter, thus assisting in heating the catalytic converter to its light-off temperature. Once the catalyst has reached its light-off temperature, the exhaust gases containing unburned fuel and air can be allowed to react with one another exothermically within the catalytic converter to heat the catalytic converter further either immediately after the flame in the afterburner has been extinguished or to prevent the catalytic converter from dropping below its light-off temperature during idling and part load operation.

In another mode of operation, fuel and air are supplied at stoichiometry directly to the first plenum of the intake manifold system and EGR gases are supplied exclusively to the second intake ducts. By keeping the stratified dilution of EGR gas under control it is possible to achieve stable combustion even at very high overall EGR flow rates. This reduces the $NO_x$ emission produced during combustion and allow the use of a three-way catalytic converter for further after treatment of the $NO_x$ in the exhaust system.

It is desirable for the flow control valve to be positioned as near to the intake valves as possible so that the flow momentum emitting from the flow control valve and containing the mixture charge from the first intake duct should be transferred directly into the cylinder and dominate the flow motion in the desired region of the combustion chamber.

It is important to distinguish between the function of the individual flow control valves in each first intake duct and the function of the common throttle in the first plenum. The latter does not affect the internal exchange of gases between the first intake ducts across the first plenum and cannot provide the charge dilution control of the invention.

The individual flow control valves to each first intake duct may be linked to move together and used as the main load control means for the engine connected directly to the driver's input. Engine load is set by the quantity of fuel drawn into each combustion chamber from the first intake duct during the intake period and is confined to a compact homogeneous cloud of substantially constant fuel-air ratio surrounding the spark plug region of the combustion chamber, the size of the cloud determining the engine load.

This method of load control may completely replace the throttle control in the second intake duct as the sole load control means, the throttle control in the second intake duct being originally used to set the engine load by altering the intake charge density within the intake manifold. In this case the intake manifold system may dispense with the throttle control in the second intake duct although such a throttle would still be needed in many other modes of operation.

BRIEF DESCRIPTION OF THE DRAWINGS

The invention will now be described further, by way of example, with reference to the accompanying drawings, in which.

DETAILED DESCRIPTION OF PREFERRED EMBODIMENTS

Figure 1:
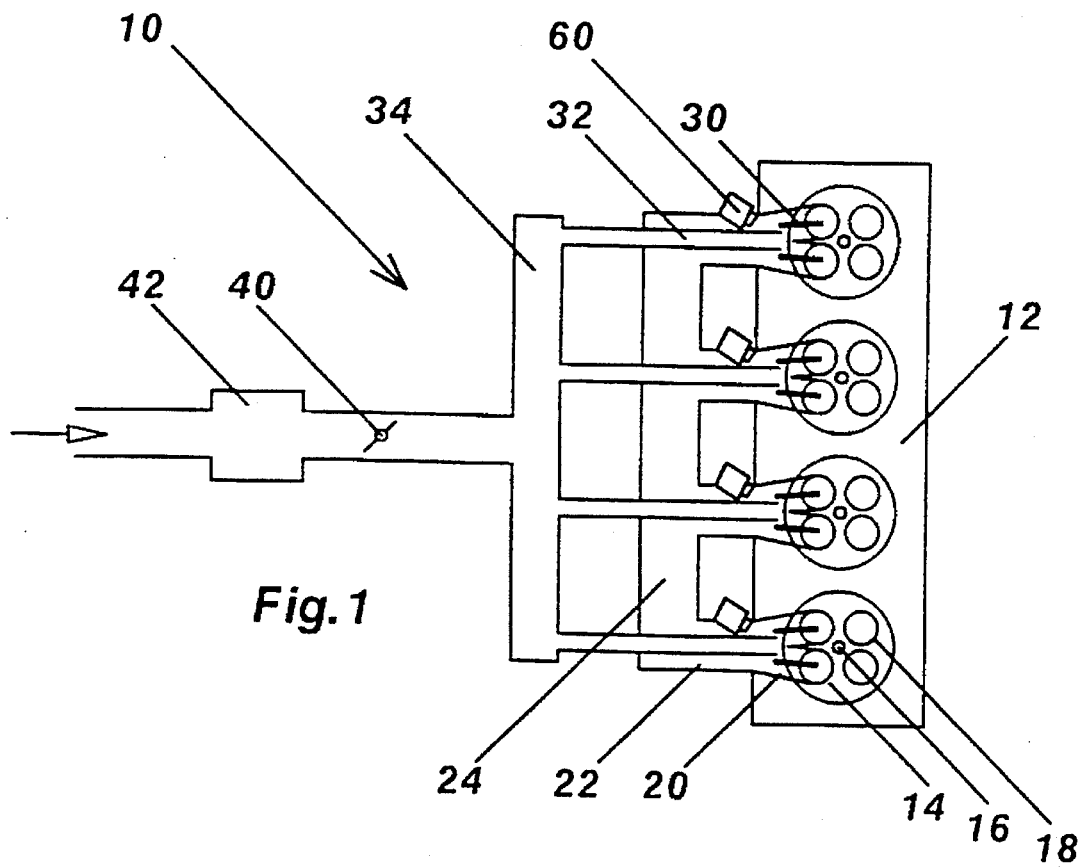
FIG. 1 is a schematic representation of a first embodiment of an intake manifold of the invention.

Throughout the drawings, like components have been allocated like reference numerals to avoid the need for repetition and where components are modified but serve an analogous purpose, a prime has been added to the reference numerals.

In FIG. 1, an engine cylinder head 12 has an intake system 10. The cylinder head 12 is of a four stroke four cylinder engine each cylinder having two intake valves 14, two exhaust valves 18 and a spark plug 16. The intake port 20 for each cylinder is connected via a first intake duct 22 to a first plenum 24 common to all the cylinders but isolated from the ambient atmosphere. Each intake port is further connected via a second intake duct 32 to a second plenum 34 that is connected to ambient through a common intake duct including a throttle valve 40 and a mass air flow meter 42. Fuel injectors 60 are arranged in the intake ports to direct a spray of fuel towards the intake valves 14.

Figure 2:
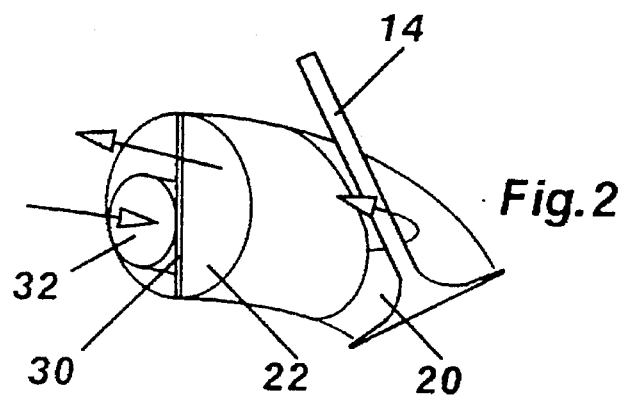
FIG. 2 is a detail showing the gas flow within a closed intake port connected to first and second intake ducts.

The detailed design of the intake port is better shown in FIG. 2 from which it will be seen that the second intake duct 32 has a significant diameter that is approximately 25% of the area of the intake port 20 and the first intake duct 22 makes up the other 75% of the area of the intake port 20. Furthermore, a partition 30 is provided to guide the gases and constrain them to flow along the path represented by the arrows. The gas discharged from the second intake duct 32 is directed along the back wall of the closed end of the intake port behind the intake valve 14 and after scouring the volume of the intake port 20 reverses its direction and enters the first intake duct 22 on the other side of the partition 30. The effect of the partition 30 is to make the positioning and the geometry of the end of the second intake duct less critical, thereby simplifying construction and assembly. Because the scavenging flow path is better defined by the partition 30, the second intake duct need not penetrate into the immediate vicinity of the intake valve.

In the embodiment of FIG. 1 the first plenum 24 is always under manifold vacuum created by whichever of the four engine cylinders is in its intake stroke. Air is drawn into the first plenum 24 through the second intake ducts 32 and the second plenum 34 past the throttle 40. All the ducts 32 therefore have air travelling through them at all times in the direction of the intake valves 14. This air is directly drawn into the cylinder if the intake valve 14 is open but otherwise flows around the intake port as described previously with reference to FIG. 2 and is stored in the first intake duct 22 and the first plenum 24. Thus, unlike a conventional engine in which there is no air movement in the intake port when the intake valve is closed, the present invention permits constant air movement in the intake port 20 all the time including the periods of the four stroke cycle of each cylinder when the respective intake valve is closed and the air required for a cylinder is not just drawn in while the intake valve of that cylinder is open, but is drawn in constantly and stored in the first intake ducts 22. It is because air is drawn in during all four strokes of the cycle that the diameter of the second intake duct need only be 25% of the full port cross-section, as it is required to deliver only one quarter of the full intake charge during each of the four strokes of the engine cycle. The relative dimensions of the two intake ducts do not depend on the number of cylinders in the bank or engine.

As soon as the intake valve 14 opens, the stored air in the first intake duct 22 enters through the port 20 into the cylinder, making up some 75% of the intake charge while the remaining 25% is directly drawn in through the second intake duct 32.

Apart from maintaining a dry intake port by evaporating all the fuel deposited in the intake port by the process of continuous convection described above, the embodiment of FIG. 1 achieves a thorough mixing within the first plenum of the charge introduced into any cylinder with the charge supplied to the other cylinders. This mixing of the charge between cylinders results in excellent fuel-air mixture preparation and also improves homogeneity between cylinders.

In the embodiment of FIG. 1, the first intake ducts 22 are relatively short and it is this length of the first intake ducts 22 that results in mixing between the charges supplied to the different cylinders.

Figure 3:
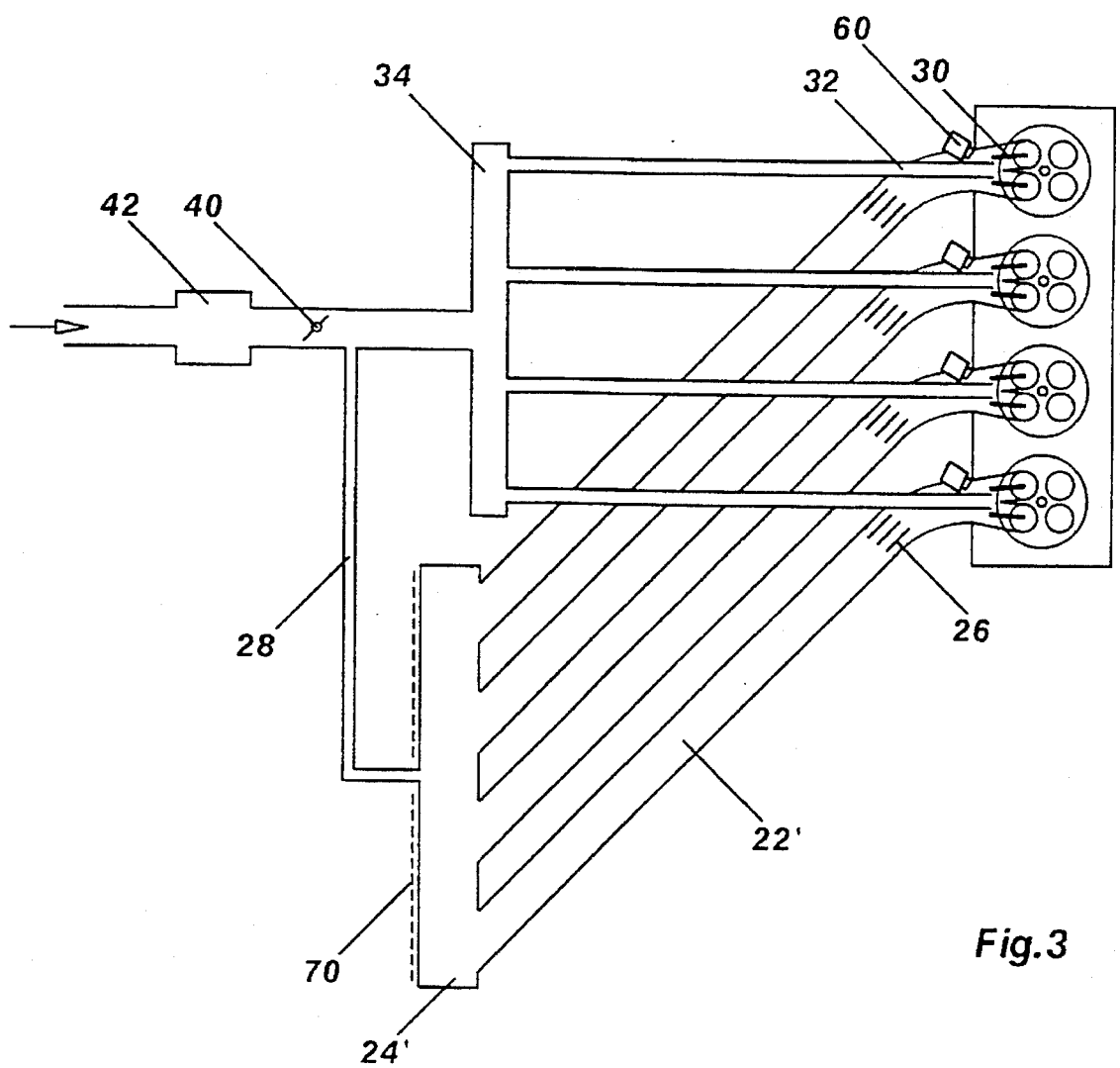
FIGS. 3, 4 and 5 are views similar to that shown in FIG. 1 of further embodiments of the invention.

In FIG. 3 the first intake ducts 22' are intentionally made significantly longer such that the overall volume of each intake duct 22' should exceed 75% of the volume of the cylinder. As a consequence, each duct can store the entire charge to be drawn into the cylinder when the intake valve 14 next opens without the respective air charges in the first intake ducts 22' of different cylinders mixing with one another.

The embodiment of FIG. 3 further differs from that of FIG. 1 in two other more minor respects namely that the first plenum 24' is heated by a heater 70 and is supplied by a purge flow of air through a small pipe 28 connected downstream of the intake throttle 40. The purpose of the heater 70 and the purge pipe 28 is to avoid accumulation of fuel within the first plenum 24' and to maintain the entire intake system dry.

In the embodiment of FIG. 3, a column of charge is stored in the first intake duct 22' which is transferred as a column into the cylinder when the intake valve 14 is opened. For this reason the fuel distribution within the column will determine the fuel distribution within the cylinder and it is possible in this way to achieve a stratified charge within the cylinder by stratifying the fuel distribution in the column. Charge stratification within the cylinder is assisted by providing a flow straightener 26 within the first intake duct 22' to maintain parallel flow and avoid mixing across the cross-section of the first intake duct 22' and by designing the intake port 20 to promote high swirl and ensure that the charge enters as a column into the engine cylinder.

In the embodiment of FIG. 3, fuel is injected by means of the fuel injectors 60 shortly before or after the intake valve 14 closes. The injection of fuel shortly before the intake valve 14 closes will place fuel at the top of the charge in the combustion chamber in the vicinity of the spark plug. Fuel injected shortly after the valve closes will be swept into the first intake duct 22' by the air flow from the second intake duct 32 and will be stored as a stratified column in the first intake duct 22' with the bulk of the fuel contained at the end of the column remote from the intake port. The other end of the column will contain hardly any fuel as the port will have been dried by the air flow. When this column is transferred to the engine cylinder the region with high fuel concentration will therefore once again reside at the top of the cylinder near the spark plug.

The advantages of running an engine with a stratified charge are in themselves well known. In particular one may achieve overall very lean mixtures because the problems normally associated with igniting weak mixtures are avoided. The load within the engine can also be controlled by varying the fuel quantity injected rather than varying the air mass thereby allowing the engine to run with a lesser degree of throttling and lower pumping losses.

There are other advantages that stem from running with a dry intake port, namely improved transient response, better cold starts and reduced hydrocarbon emissions while the engine is overrunning.

The improved charge preparation achieved by the above described embodiments also makes them especially useful in engines in which load control is effected by variable valve timing. These engines are desirable from the point of view of reducing pumping losses and allowing less throttling to be used in the intake system, but they have the problem of reduced and intermittent air flow which adversely affects fuel preparation to such an extent as to counteract the benefit. In the present invention, even with such a variable valve timing system in operation, one can achieve an almost steady flow through the second intake ducts 32 to give rise to improved fuel preparation and to reduce wetting of the intake port.

Figure 4:
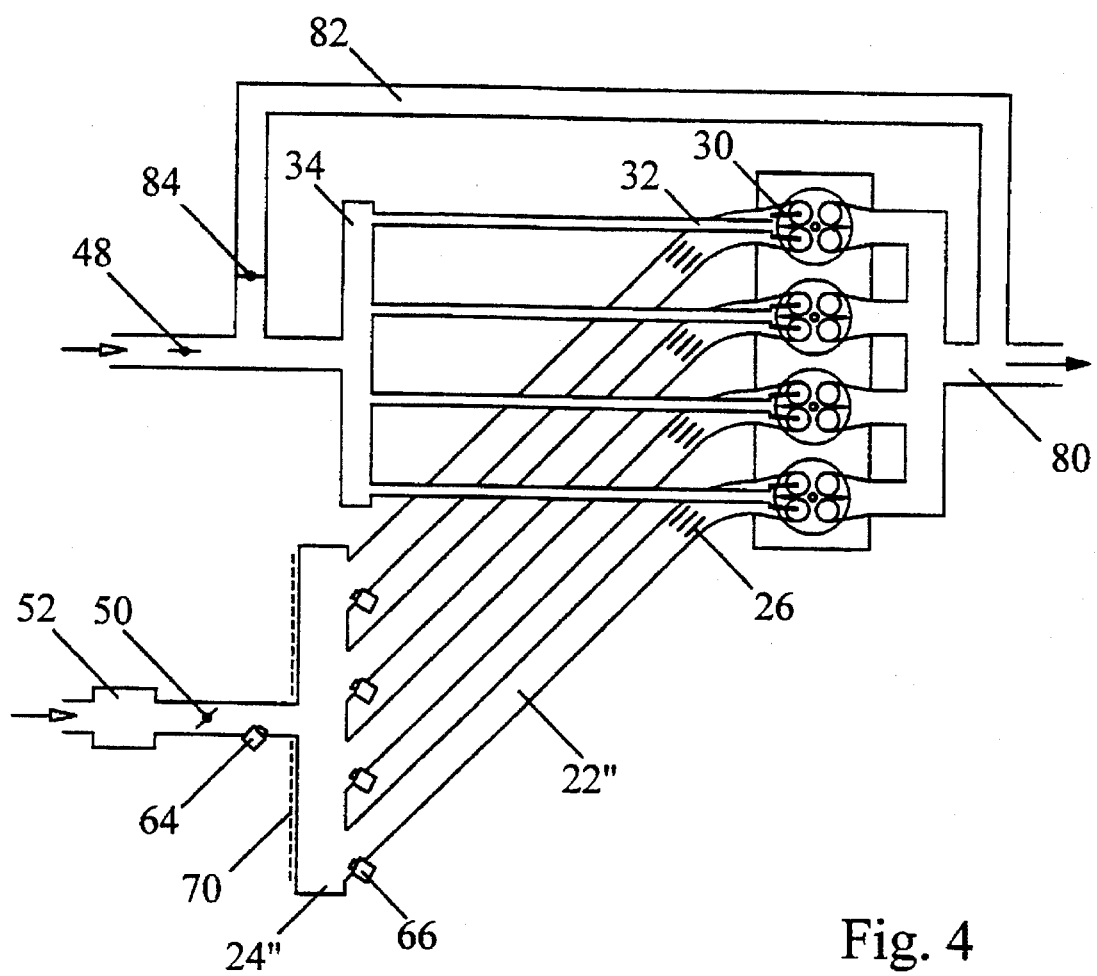

The embodiment of FIG. 4 differs from that of FIGS. 1 and 3 in that the first plenum 24" is the one connected to the main throttle 50 and the mass air flow meter 52. An EGR duct 82 connects the exhaust pipe 80 to the common duct of the second plenum 34 and variable throttles 48 and 84 are used to regulate the flows of air and EGR gases respectively into the second plenum 34. This embodiment also differs from that of FIG. 3 in that a central fuel injector 64 is provided for injecting fuel into the first plenum 24" and further injectors 66 are optionally provided at the ends of the first intake ducts 22" remote from the intake ports for injecting fuel into the first plenum 24".

In FIG. 4, gas exchange between the individual first intake ducts 22" across the first plenum 24" will ensure a homogeneous fuel-air mixture in the first plenum 24". To prevent wet fuel from accumulating in the first plenum 24" the injected fuel from fuel injector 64 or fuel injectors 66 should be finely atomised or fully vaporised. A heater 70 may also be provided to warm the first plenum 24" to assist in fuel evaporation.

In FIG. 4, each first intake duct 22" again contains a charge that is introduced as a column into the engine cylinder to achieve charge stratification. However, the charge is introduced into the column from both ends and the relative proportion of gases drawn in from the two plenums 24" and 34 is determined by the setting of the throttles 50 and 48 or 84.

If one considers first operation with the throttle 50 nearly closed and the throttle 48 open and the throttle 84 fully closed, then in this mode the system does not differ from the embodiment of FIG. 3 except in that the fuel is held at the end of the column remote from the engine cylinder by being injected there in the first place instead of being carried there by the air drawn in through the second intake duct 32.

With the throttle 48 closed on the other hand and the throttle 50 fully open, the intake system operates in the same manner as a conventional intake system with central fuel injection as the second intake ducts 32 will play no part in the operation.

At intermediate settings, that is to say with both of the valves 48 and 50 partially opened, each first intake duct 22" will contain a divided charge with a fuel and air mixture at the end remote from the intake port drawn in through the first plenum 24" and air at the other end drawn in from the second plenum 34.

In this divided charge, instead of air alone being present at the end of the column nearer the intake port, one can introduce an air and EGR mixture with the proportion of EGR determined by the relative setting of the throttles 48 and 84. In the extreme settings the throttle 48 is fully closed and the throttle 84 is opened to achieve a divided charge in which the first part drawn into the combustion chamber consists exclusively of EGR gases.

The intake system as described with reference to FIG. 4 offers all the advantages described with reference to FIG. 3 that result from being able to run the engine with a stratified charge. A divided charge however has a further advantage that one may achieve a uniform charge composition near the top of the combustion chamber and a uniform but totally different charge composition near the bottom. In this way one can guarantee robust ignition by surrounding the spark plug with a pre-mixed ignitable mixture while essentially confining the combustion to the top part of the combustion chamber.

Such operation can be used with advantage in several circumstances. First, by arranging for the mixture drawn in through the first plenum 24" to be stoichiometric while drawing in a large amount of air or EGR gas from the second plenum 34, one can achieve stable combustion with mixtures of very high overall dilution. If the gas drawn in from the second plenum 34 consists only of EGR gases, then an overall stoichiometric mixture can still be burnt despite the very high dilution thereby permitting the use of a three way catalyst for after treatment of the exhaust gases.

In the embodiment of FIG. 4, each cylinder receives a charge that comprises a lower region devoid of fuel and an upper region containing a homogeneous fuel and air mixture. Load is controlled by varying the relative proportions of these two regions. The fuel contained in the upper region sets the load conditions.

Because EGR gases are drawn into the individual intake ports directly, it is important in this embodiment that the intake port should be dry. Dryness of the intake port can be achieved by not injecting fuel into the port but into the other ends of the first intake ducts, as illustrated. Alternatively, fuel injection can be timed to coincide with times that air from the first plenum 24" is flowing into the cylinder through the intake port. In this case, it is desirable to design the injector to aim a spray of fuel directly into the cylinder through the open intake valve, without any of the fuel being deposited on the wall of the intake port.

The embodiment of FIG. 4 can also be operated in a mode that assists in heating or managing the temperature of a catalytic converter during cold starts in that it can be used to ensure the presence of a high proportion of both air and unburned fuel in the exhaust gases that can react with one another in the exhaust system to give off heat either in the catalytic converter or in an afterburner used to heat the catalytic converter. In this respect one can burn a mixture which is stoichiometric averaged over the entire volume of the cylinder but with an extremely rich composition in the vicinity of the spark plug. This can achieve exhaust gas ignition (EGI) without the need for an additional air pump for supplying air directly into the exhaust system and assists in simplifying the fuel metering system necessary to implement EGI.

Figure 5:
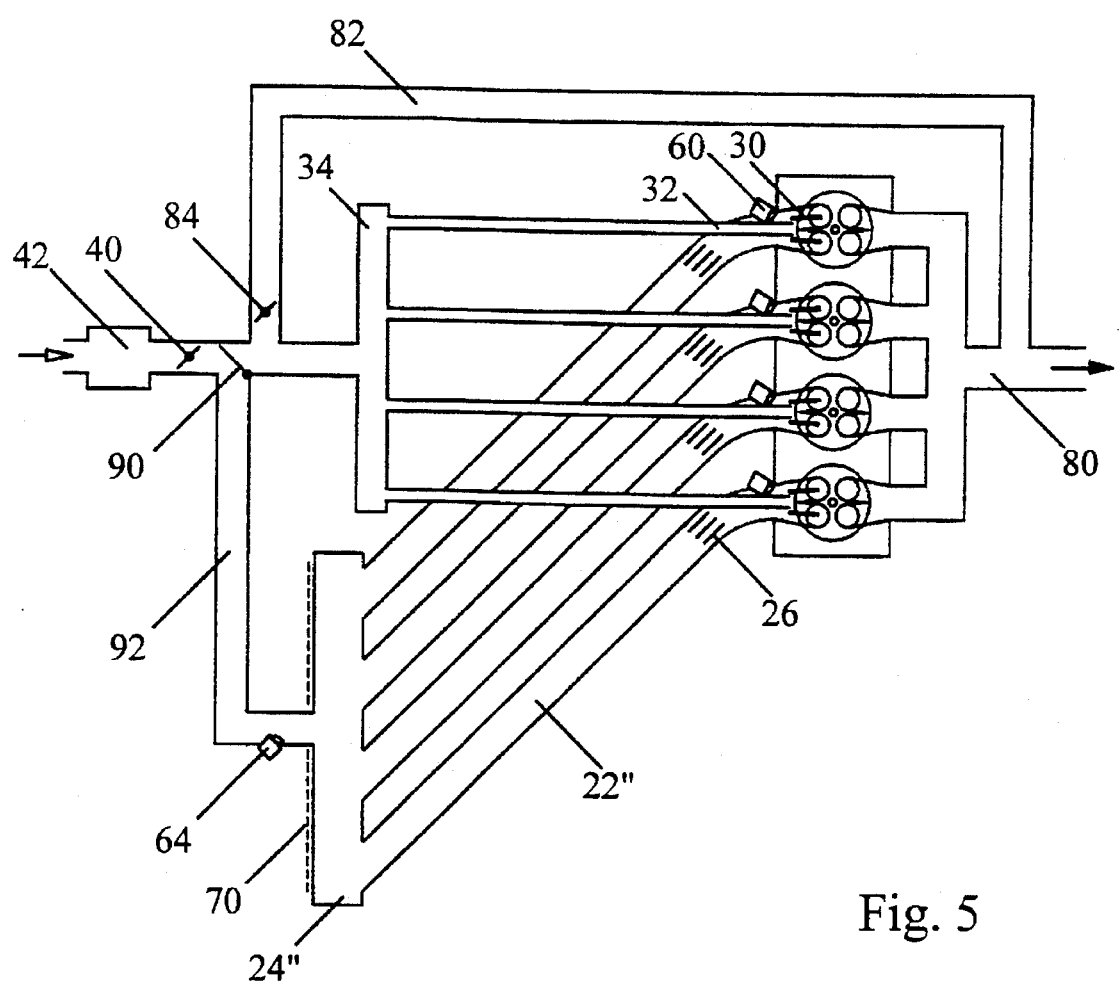

The embodiment of FIG. 5 is essentially an amalgamation of all the previously described embodiments of the invention, that enables the intake system to benefit from all the advantages detailed above. The intake throttle 40 and mass air flow meter 42 are now common to both the first and the second plenums 24" and 34 and a diverter valve 90 controls the relative proportions of air supplied directly to the second plenum 34 and through a pipe 92 to the first plenum 24". It will readily be seen without further description that depending on the position of the valve 90, this embodiment will operate in the same way as that of FIG. 3 or that of FIG. 4. The advantage of this embodiment, apart from versatility, resides in the fact that the mass air flow meter 42 measures the total air flow into the engine. The fuel flow can therefore be calibrated against a single air flow measurement.

Figure 6:
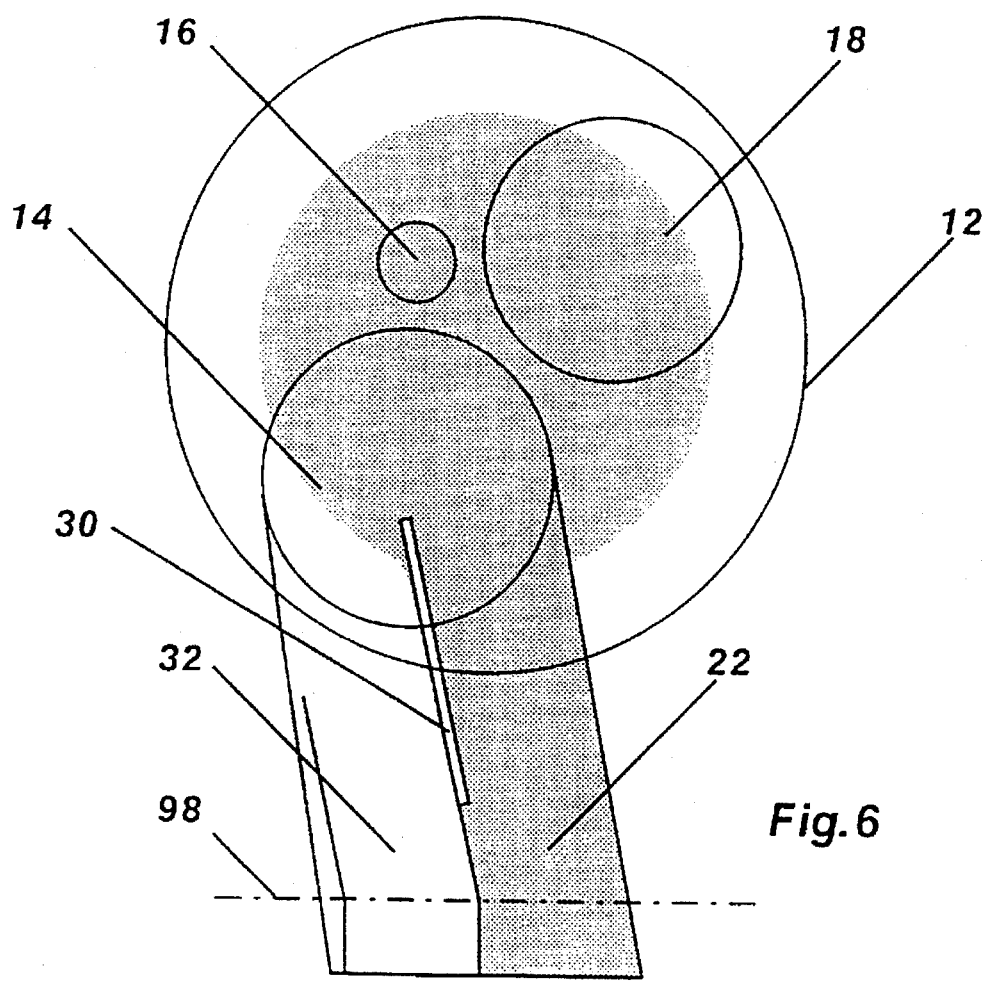
FIG. 6 is a schematic cross section through an intake port and a cylinder head of a combustion chamber of an alternative embodiment of the invention having a variable flow control valve in the first intake duct, the drawing showing the region with high fuel concentration that occurs in an engine designed to promote swirl in the cylinder.
Figure 7:
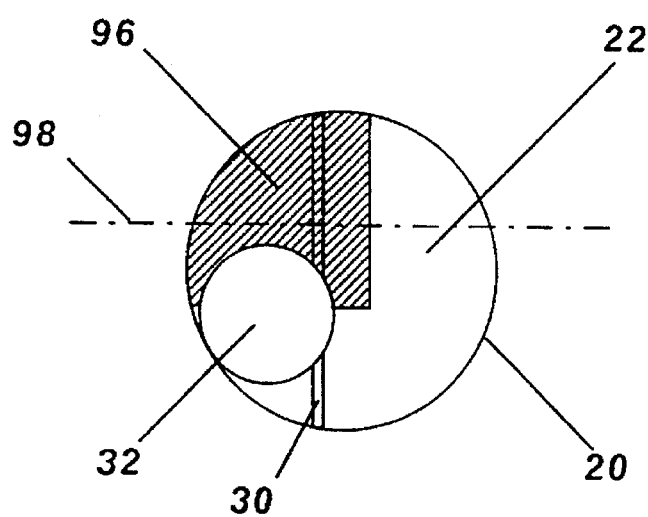
FIG. 7 is a vertical section through the intake port in FIG. 6 along the axis 98.

In FIGS. 6 and 7 a combustion chamber in the cylinder head 12 has an intake valve 14, an exhaust valve 18 and a spark plug 16. An intake port 20 designed to promote swirl receives air from a first intake duct 22 and a second intake duct 32. The relative proportions of the charge drawn in through the first and second ducts can be varied by a butterfly valve 96 mounted immediately upstream of the intake valve 14 for rotation above an axis 98. In the position occupied by the valve 96 in FIG. 7 the first duct is partially obstructed and the butterfly 96 can be rotated about the axis 98 to lessen or remove the obstruction. The shaded regions in FIG. 6 represents a homogeneous fuel-air mixture that is drawn in from the first intake duct 22. The non-shaded regions represent air or EGR gas drawn in through the second intake duct 32. The geometry of the intake port is selected such that the two streams drawn in from the respective ducts do not mix in the intake port and remain separate as they swirl into the combustion chamber. As a result of this motion, the charge within the combustion chamber is stratified with a central cloud of homogeneous mixture in the vicinity of the spark plug 16 and an annular surrounding region containing little or no fuel. By this method an overall high degree of dilution can be achieved while maintaining a readily ignitable mixture near the spark plug. By varying the position of the butterfly 96 the relative proportions of these two regions can be modified and this can be used to set the engine load at least over part of the operating range of the engine.

Because of mixing that continues within the combustion chamber during the compression stroke, the separation between the shaded and un-shaded regions will become progressively less distinct. Consequently, a small volume of either region will not survive in keeping its identity for very long and will merge uniformly with the bulk of the charge. It is therefore desirable to use the flow control butterfly 96 to vary the relative proportion of either region to at least 25% of the total volume in order to achieve significant stratification.

Charge stratification can be used in a variety of fuelling strategies. If it is desired to achieve very lean burn then one can meter the fuel in dependence upon the amount of air drawn in through the first intake duct only. This air mass can be determined by measuring the overall air intake mass flow and computing the proportion of the charge drawn in through the first intake duct from the setting of the butterfly 96. In this case though the overall mixture is very lean the ignitability is not affected as the part of the charge near the spark plug can be controlled to be stoichiometric.

Alternatively, one can meter the fuel in dependence upon the overall air mass flow such that the overall fuel-air mixture is stoichiometric. Here the cloud near the spark plug may be excessively rich and may not undergo complete combustion, but in such a case the exhaust gases will remain stoichiometric and will contain unburned fuel as well as unused air coming from other parts of the charge remote from the spark plug. Such exhaust gas mixture can be re-ignited or reacted in the exhaust system to assist in heating a catalytic converter to its light-off temperature.

Figure 8:
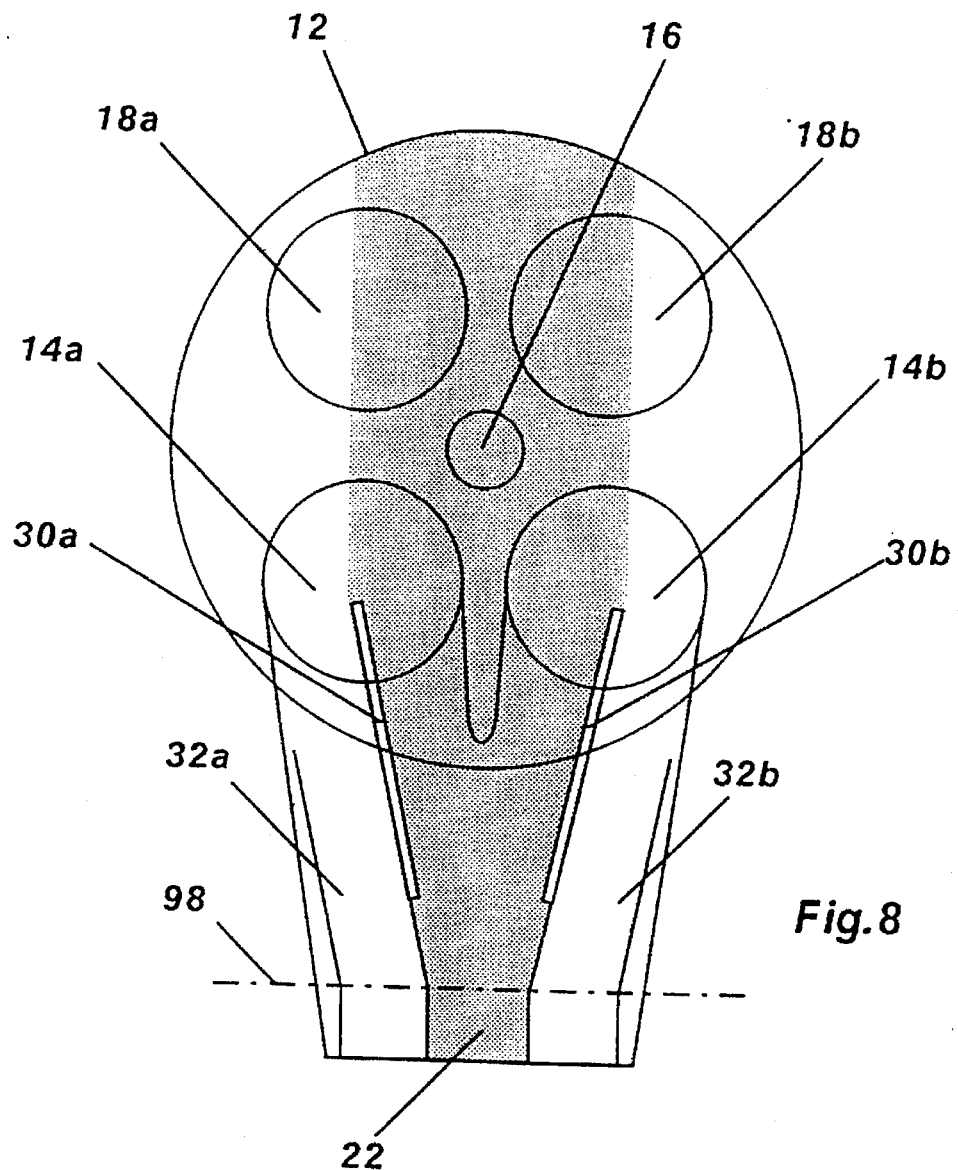
FIG. 8 is a section similar to that of FIG. 6 for an engine having two intake valves in each cylinder and intake ports for the valves designed to promote tumble in the cylinder.
Figure 9:
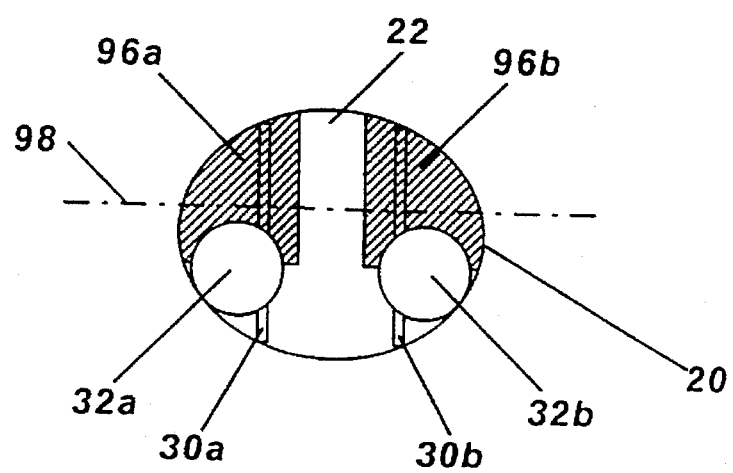
FIG. 9 is a section similar to that of FIG. 7 taken along the axis 98 in FIG. 8.

The embodiment of FIGS. 8 and 9 differs in two major respects from that previously described. First, the engine in this case has two intake valves per cylinder. Second, because in such an engine the intake ports cannot promote swirl when both valves are in use, the intake port or ports promote tumble in the combustion chamber. It should be specified in the interest of clarity that swirl is taken in the present context to refer to a rotation of the air mass about the central axis of the cylinder whereas tumble refers to rotation of the air mass about an axis normal to the central axis of the cylinder, the rotation taking place in planes parallel to a plane containing the central axis.

To achieve charge stratification in an engine with such tumbling motion, the embodiment of FIG. 8 has two symmetrically disposed second intake ducts 32a and 32b that are directed towards the sides of the intake valves 14a and 14b furthest from one another. The gas entering through the second intake ducts 32a and 32b flows into the non-shaded regions of the combustion chamber while the fuel and air mixture entering through the first intake duct 22 remains concentrated about the plane of symmetry passing between the two intake valves 14a and 14b and containing the spark plug 16. The butterflies 96a and 96b once again allow the relative proportions of the gases drawn in from the respective ducts to be varied. When the first intake duct 22 is obstructed to its minimum cross-section, the region containing the fuel-air mixture is restricted to a narrow shaded band in the cylinder about the plane of symmetry. When the obstruction is removed by rotating the butterflies 96a and 96b about the axis 98 the shaded band in the cylinder widens to occupy an increasing proportion of the combustion chamber and reduce the overall dilution.

Once again the butterflies can be used to set engine load over at least part of the operating range of the engine and different fuel metering strategies may be adopted to achieve different effects that take advantage of the charge stratification.

I claim:

1. An intake manifold system for a multi-cylinder four stroke spark-ignition internal combustion engine (12), wherein each cylinder has at least one intake port (20), each intake port (20) being connected at one end to the combustion chamber by at least one intake valve (14) and at the other end to a first intake duct (22) that is connected to a first plenum (24) common to the first intake ducts (22) of other engine cylinders, wherein each intake port (20) is further supplied with gases containing no fuel by a second intake duct (32) having a fixed outlet cross-sectional area equal to between 25% and 45% of the maximum effective through flow cross-sectional area of the open intake valve, the second intake duct (32) being directed towards the closed end of the intake port (20) whereby, during the periods that the intake valve is closed, gas is drawn in through the second intake duct (32) by manifold vacuum and stored in the first intake duct (22), and wherein the solid boundary walls of the intake port (20) and of the discharge end of the second intake duct (32) define a U-shaped flow path for guiding the gas entering the intake port from the second intake duct, the geometry of the solid boundaries being such that during operation gas enters from one side of the intake port, performs a single U-turn by flowing around the intake valve stem (14) while adhering to the walls of the intake port (20) and enters the first intake duct from the other side of the intake port, the gas being thereby constrained to scavenge the closed end of the intake port (20) and to displace substantially all the gases previously present therein into the first intake duct (22).

2. An intake manifold system as claimed in claim 1, wherein a partition is provided in the intake port to separate the gas flowing out of the second intake duct towards the closed end of the intake port from the gas flowing from the closed end of the intake port towards the first intake duct.

3. An intake manifold system as claimed in claim 2, wherein the partition is formed of a wall terminating near the stem of the intake valve.

4. An intake manifold system as claimed in claim 1, wherein the through flow cross-section of the second intake duct is substantially equal to 25% of the maximum effective through flow cross-section of the intake port.

5. An intake manifold system as claimed in claim 1, wherein the total volume of the intake port and the first intake duct of each cylinder exceeds 75% of the cylinder intake charge such that all of the flow from the second intake duct drawn in during the part of the four stroke engine cycle of the cylinder when the intake valve is closed is stored in the first intake duct, and is drawn into the combustion chamber during the intake stroke of the same cylinder when the intake valve is opened.

6. An intake manifold system as claimed in claim 1, wherein the total volume of the intake port and the first intake duct of each cylinder lies between 10% and 40% of the cylinder intake charge such that a substantial proportion of the flow from the second intake duct is discharged into the first plenum and is drawn into the adjacent cylinders.

7. An intake manifold system as claimed in claim 1 wherein substantially no air is supplied to the cylinders through the first plenum, substantially all the intake air to the engine being supplied from the second intake ducts via a second plenum, a throttle control valve, and an air flow meter.

8. An intake manifold system as claimed in claim 7, wherein a fuel injector is provided in the intake port of each cylinder to direct a fuel spray towards the closed end of the intake port, the engine load being controlled by varying the air flow supplied to the combustion chamber from the second plenum and fuel being metered in dependence upon the measured air flow.

9. An intake manifold system as claimed in claim 1, wherein within at least one range of engine loads, the throttle valve regulating the intake air flow is maintained constant and the engine load is controlled within the range by varying the quantity of fuel metered to the engine.

10. An intake manifold as claimed in claim 9, wherein the timing of fuel injection into the intake port is varied to control the stratification of the charge stored as a column in the first intake duct.

11. An intake manifold system as claimed in claim 8, wherein means are provided for purging the first plenum to avoid accumulation of fuel therein, said means including heating means or a means for directing a small gas flow through the first plenum.

12. An intake manifold system as claimed in claim 1, wherein the first intake ducts of the cylinders and the first plenum are connected to the ambient via a first throttle control valve and an air flow meter, the second intake ducts of the cylinders are connected to the ambient via a second plenum and a second throttle control valve, the two throttle control valves serving to vary the relative proportions of intake air flows drawn into the combustion chamber, first from the length of the first intake duct nearer to the intake valve and containing air previously filled from the second plenum, then from the length of the first intake duct nearer to the first plenum and containing air from the first plenum.

13. An intake manifold system as claimed in claim 12, wherein fuel is supplied to the first plenum by means of at least one fuel injector or a carburettor whereby fuel is metered in dependence upon the measured air flow, the engine load being controlled by varying the amount of fuel-air mixture supplied to the combustion chamber from the first plenum.

14. An intake manifold system as claimed in claim 13, wherein means are provided in the first plenum for vaporising or finely atomising the fuel.

15. An intake manifold system as claimed in claim 13, wherein immediately after cold start of the engine, the fuel-air mixture inside the first plenum is calibrated to be excessively rich and the two throttle control valves are calibrated to give an overall stoichiometric or leaner than stoichiometric trapped content in the combustion chamber made up of a divided charge determined by the relative proportions of the intake flows drawn into the combustion chamber, first from the length of the first intake duct nearer the intake valve and containing air previously filled from the second plenum, then from the length of the first intake duct nearer the first plenum and containing excessively rich fuel-air mixture from the first plenum, thus producing after combustion exhaust gases containing a large quantity of unburned fuel mixed with sufficient quantity of air to be ignitable again in an afterburner in the exhaust system in order to generate sufficient heat to raise the temperature of a catalytic converter rapidly above its light off temperature.

16. An intake manifold system as claimed in claim 1, wherein an exhaust gas recirculation (EGR) duct is connected from the engine exhaust system to the second plenum for introducing a regulated exhaust gas dilution concentration to the air flow in the second plenum.

17. An intake manifold system as claimed in claim 12, wherein the second throttle control valve is completely shut to isolate the second plenum from ambient and an exhaust gas recirculation (EGR) duct is connected from the engine exhaust system to the second plenum, respective flow control valves in the EGR duct and the first plenum serving to vary the relative proportions of exhaust gas and intake air drawn into the combustion chamber, first from the length of the first intake duct nearer the intake valve and containing exhaust gases previously filled from the second plenum, then from the length of the first intake duct nearer the first plenum and containing fuel-air mixture from the first plenum.

18. A multi-cylinder four stroke spark-ignition internal combustion engine with an intake manifold system as claimed in claim 9, wherein the intake charge drawn into the combustion chamber from the first intake duct which has been previously filled with a column of stratified fuel-air mixture along the length of the duct forms within the combustion chamber a substantially stratified charge distributed along the length of the combustion chamber in a similar pattern of stratification to that in the first intake duct with the richest region nearer the top of the combustion chamber.

19. A multi-cylinder four stroke spark-ignition internal combustion engine with an intake manifold system as claimed in claim 13, wherein the intake charge drawn into the combustion chamber, first from the length of the first intake duct nearer the intake valve and containing air previously filled from the second plenum, then from the length of the first intake duct nearer the first plenum and containing a homogeneous fuel-air mixture from the first plenum, forms within the combustion chamber a substantially divided charge of two homogeneous zones positioned along the length of the combustion chamber with the fuel-air mixture at the top of the combustion chamber and air at the bottom of the combustion chamber.

20. A multi-cylinder four stroke spark-ignition internal combustion engine with an intake manifold system as claimed in claim 17, wherein the intake charge drawn into the combustion chamber, first from the length of the first intake duct nearer the intake valve and containing exhaust gases previously filled from the second plenum, then from the length of the first intake duct nearer the first plenum and containing a homogeneous fuel-air mixture from the first plenum, forms within the combustion chamber a substantially divided charge of two homogeneous zones positioned along the length of the combustion chamber with the fuel-air mixture at the top of the combustion chamber and exhaust gases at the bottom of the combustion chamber.

* * * * *